(No Model.)
L. W. HAMMOND.
COVER FOR CULINARY UTENSILS.
No. 561,584. Patented June 9, 1896.
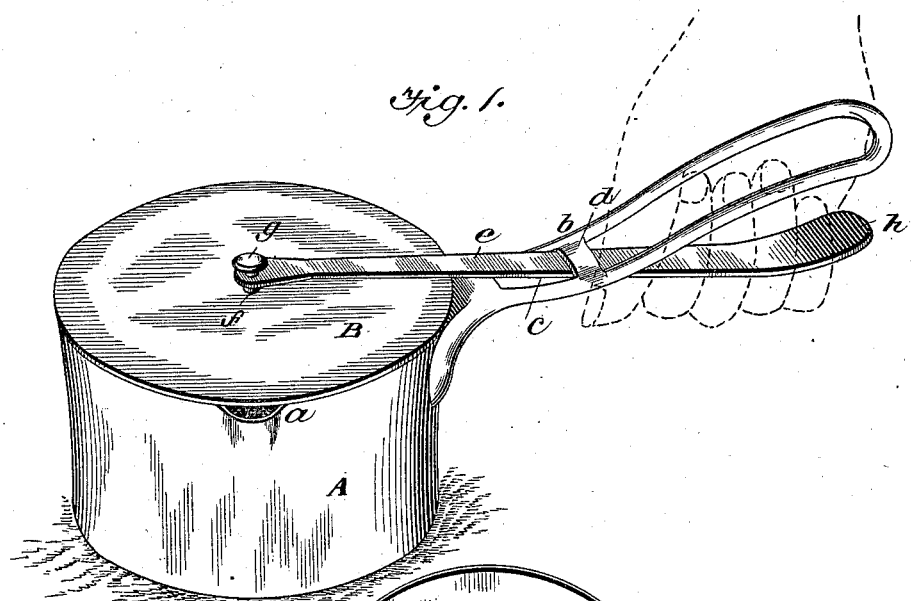
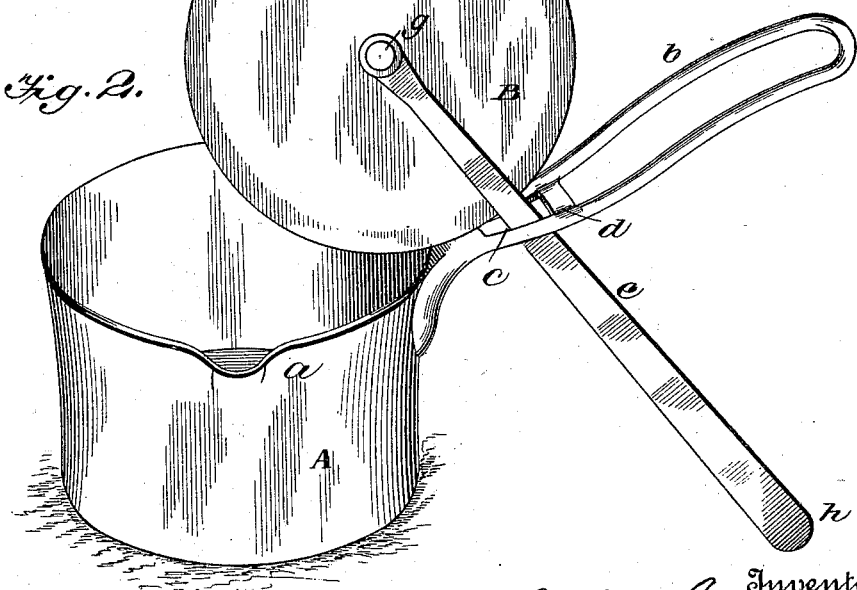
Witnesses
Inventor
Attorney

UNITED STATES PATENT OFFICE.

LEANDER W. HAMMOND, OF NORTH PLAINFIELD, NEW JERSEY.

COVER FOR CULINARY UTENSILS.

SPECIFICATION forming part of Letters Patent No. 561,584, dated June 9, 1896.

Application filed June 26, 1895. Renewed April 13, 1896. Serial No. 587,418. (No model.)

*To all whom it may concern:*

Be it known that I, LEANDER W. HAMMOND, a citizen of the United States, residing at North Plainfield, in the county of Somerset and State of New Jersey, have invented certain new and useful Improvements in Covers for Cooking Utensils; and I do hereby declare the following to be a full, clear, and exact description of the invention, such as will enable others skilled in the art to which it appertains to make and use the same.

This invention has relation to improvements in covers for cooking utensils; and it consists in the novel construction, combination, and arrangement of parts of which it is composed, all as will be hereinafter fully described, and particularly pointed out in the appended claim.

The annexed drawings, to which reference is made, fully illustrate my invention, in which—

Figure 1 represents a perspective view of my device, showing it upon a cooking utensil, the cover closed upon the same; and Fig. 2 is a similar view showing the cover raised.

Referring by letter to the accompanying drawings, A designates a cooking utensil or stew-pan having the pouring-out spout $a$ and a handle $b$, spanning the slot $c$ of which is a transverse bar $d$.

B represents the cover or lid, and $e$ the handle attached thereto, about the center thereof, by a pin $f$, having a knob $g$. This handle of the cover is large at the free end $h$ and tapers toward the knob $g$, said enlarged portion being flat and somewhat wider than the slot in the handle. Thus it will be seen that the handle of the cover is detachably attached to the handle of the pot or cooking utensil, and that the person using the device cannot be injured by the steam from the utensil, and it requires only one hand to both lift the pot and at the same time hold firmly the cover down on the same.

In removing the cover from the utensil the person grasps the knob, raises the lid or cover thereby and turns the handle thereof, and withdraws the same from the slot in the handle of the utensil.

What I claim, and desire to secure by Letters Patent, is—

The combination of the vessel provided with a handle, a slot or opening near the lower or inner portion of said handle, of a cover provided with a tapering handle secured thereto by means of pin $f$ and knob $g$ said tapering handle adapted to coöperate with the handle of the vessel whereby the cover is held in position on the vessel substantially as described.

In testimony whereof I affix my signature in presence of two witnesses.

LEANDER W. HAMMOND.

Witnesses:
JOSEPH P. HUMBLE,
JACOB F. KETTERWING.